(12) United States Patent
Okamura

(10) Patent No.: US 7,701,156 B2
(45) Date of Patent: Apr. 20, 2010

(54) ELECTRIC MOTOR DRIVE CONTROL SYSTEM AND CONTROL METHOD THEREOF

(75) Inventor: Masaki Okamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 369 days.

(21) Appl. No.: 11/802,523

(22) Filed: May 23, 2007

(65) Prior Publication Data

US 2007/0278986 A1 Dec. 6, 2007

(30) Foreign Application Priority Data

May 30, 2006 (JP) ............... 2006-150110

(51) Int. Cl.
*H02P 1/00* (2006.01)
*H02P 23/00* (2006.01)

(52) U.S. Cl. ............ 318/255; 318/254; 318/400.21; 701/54; 701/55; 180/65.265; 180/65.275

(58) Field of Classification Search ......... 318/245, 318/254, 139, 430, 400.21, 255, 798; 701/54, 701/55; 903/945, 947; 180/65.265, 65.275
See application file for complete search history.

(56) References Cited

U.S. PATENT DOCUMENTS

| | | | |
|---|---|---|---|
| 5,373,195 A | | 12/1994 | De Doncker et al. |
| 7,084,590 B2 | | 8/2006 | Miyamoto et al. |
| 2005/0256633 A1 | * | 11/2005 | Heap et al. ............ 701/101 |
| 2007/0058406 A1 | * | 3/2007 | Inoshita et al. ......... 363/132 |
| 2007/0093953 A1 | * | 4/2007 | Heap et al. ............ 701/103 |
| 2008/0118922 A1 | * | 5/2008 | Matsui et al. ............ 435/6 |
| 2008/0143281 A1 | * | 6/2008 | Yaguchi ............ 318/139 |
| 2008/0220298 A1 | * | 9/2008 | Ishikawa et al. ......... 429/22 |
| 2009/0033156 A1 | * | 2/2009 | Chakrabarti et al. ....... 307/82 |
| 2009/0118076 A1 | * | 5/2009 | Heap et al. .............. 477/3 |
| 2009/0118089 A1 | * | 5/2009 | Heap et al. |
| 2009/0118883 A1 | * | 5/2009 | Heap et al. |
| 2009/0118884 A1 | * | 5/2009 | Heap |
| 2009/0118918 A1 | * | 5/2009 | Heap et al. ............ 701/54 |
| 2009/0118919 A1 | * | 5/2009 | Heap et al. ............ 701/54 |
| 2009/0118920 A1 | * | 5/2009 | Heap et al. ............ 701/54 |
| 2009/0118946 A1 | * | 5/2009 | Heap et al. ............ 701/55 |
| 2009/0118947 A1 | * | 5/2009 | Heap et al. ............ 701/55 |
| 2009/0118948 A1 | * | 5/2009 | Heap et al. ............ 701/55 |

(Continued)

FOREIGN PATENT DOCUMENTS

JP A 2001-238490 8/2001

(Continued)

*Primary Examiner*—Paul Ip
(74) *Attorney, Agent, or Firm*—Oliff & Berridge PLC

(57) ABSTRACT

A voltage command value of a converter is set by executing the step of determining a candidate voltage of a system voltage VH as a converter output voltage in a voltage range from the minimum necessary voltage corresponding to induction voltage of a motor generator and a maximum output voltage of the converter; the step of estimating power loss at the battery, converter, inverter and motor generator, at each candidate voltage, and calculating total sum of estimated power loss of the overall system; and the step of setting the voltage command value VH# based on the candidate voltage that minimizes the total sum of estimated power losses among the candidate voltages.

10 Claims, 9 Drawing Sheets

U.S. PATENT DOCUMENTS

| | | | |
|---|---|---|---|
| 2009/0118950 A1* | 5/2009 | Heap et al. | 701/55 |
| 2009/0118951 A1* | 5/2009 | Heap et al. | 701/56 |

FOREIGN PATENT DOCUMENTS

| | | |
|---|---|---|
| JP | A 2003-33071 | 1/2003 |
| JP | A 2003-116280 | 4/2003 |
| JP | A 2003-348892 | 12/2003 |
| JP | A 2005-198406 | 7/2005 |
| JP | A 2005-269723 | 9/2005 |
| JP | A-2006 020418 | 1/2006 |
| JP | A 2006-311768 | 11/2006 |

* cited by examiner

FIG.2

| CONTROL METHOD | MAXIMUM TORQUE CONTROL | | FIELD WEAKENING CONTROL |
|---|---|---|---|
| | SINUSOIDAL PWM | OVERMODULATED PWM | RECTANGULAR WAVE (1 PULSE) |
| WAVEFORM OF INVERTER OUTPUT VOLTAGE | FUNDAMENTAL WAVE COMPONENT | FUNDAMENTAL WAVE COMPONENT | FUNDAMENTAL WAVE COMPONENT |
| MODULATION FACTOR | 0~0.61 | 0.61~0.78 | 0.78 |
| CHARACTERISTIC | TORQUE VARIATION SMALL | BETTER OUTPUT AT MIDDLE SPEED RANGE | BETTER OUTPUT AT HIGH SPEED RANGE |
| SWITCHING LOSS WITH SAME VOLTAGE/CURRENT | LARGE | MEDIUM | SMALL |

ELECTRIC MOTOR DRIVE CONTROL SYSTEM AND CONTROL METHOD THEREOF

This nonprovisional application is based on Japanese Patent Application No. 2006-150110 filed with the Japan Patent Office on May 30, 2006, the entire contents of which are hereby incorporated by reference.

BACKGROUND OF THE INVENTION

1. Field of the Invention

The present invention relates to an electric motor drive control system and control method thereof and, more specifically, to an electric motor drive control system formed with a converter allowing variable control of a DC voltage.

2. Description of the Background Art

Conventionally, as a type of an electric motor drive control system driving an AC electric motor, a structure has been used in which a DC voltage variably controlled by a converter is converted to an AC voltage for controlling driving of an AC electric motor using an inverter (see, for example, Japanese Patent Laying-Open Nos. 2003-33071 and 2003-116280, hereinafter referred to as Patent Documents 1 and 2, respectively).

By way of example, Patent Document 1 discloses a motor controller including a converter as a PAM (Pulse Amplitude Modulation) circuit and an inverter as a PWM (Pulse Width Modulation) circuit for converting an output voltage from the PAM circuit to an AC voltage. Particularly, in the motor controller disclosed in Patent Document 1, by balancing the durability of switching elements in the converter and the inverter, the life of the controller as a whole is enhanced.

In the drive device disclosed in Patent Document 2, a current flowing in a reactor in a converter is calculated by dividing an output battery power demanded of a battery, which is obtained by converting motive power required of a motor to an electric power, by a voltage between terminals of the battery. In accordance with the calculated current, carrier frequency of transistors forming the converter is set such that converter loss is minimized, whereby energy efficiency of the drive device can be improved.

Japanese Patent Laying-Open Nos. 2003-348892 and 2001-238490 (hereinafter referred to as Patent Documents 3 and 4, respectively) disclose motor controllers in which a plurality of motors are controlled efficiently by sharing an output of a converter having a DC voltage control function among a plurality of motor driving circuits (inverters having motor control function). In the structures disclosed in Patent Documents 3 and 4, the DC voltage value output by the converter is changed in accordance with conduction ratio of each inverter or a motor load.

In the structures in which the variably controlled converter output voltage is converted to an AC voltage by an inverter for driving an AC electric motor, loss in each component of the system varies dependent on the voltage level of the output voltage of the converter, that is, the voltage on the DC-linked side of the inverter and, therefore, efficiency of the system as a whole may also vary.

Patent Documents 1 to 4, however, neither disclose nor suggest determination of the DC voltage value variably controlled by the converter in consideration of the efficiency of the system as a whole, in the electric motor drive control system having such structures as described above.

SUMMARY OF THE INVENTION

An object of the present invention is, in an electric motor drive control system having a structure including a converter formed to allow variable control of a DC voltage and an inverter converting an output of the converter to an AC voltage, to improve overall system efficiency by appropriately setting the output voltage of the converter such that electric power loss in the system as a whole is minimized.

In short, the present invention provides an electric motor drive control system and control method thereof, wherein the electric motor drive control system includes a DC power source, a converter, an inverter, and a controller. The converter is configured to allow boosting of an output voltage of the DC power source, and to variably control the output voltage of the DC power source in accordance with a voltage command value to be output to a DC power line. The inverter performs electric power conversion between DC power on the DC power line and the AC power driving an electric motor, using a plurality of switching elements, so that the electric motor operates in accordance with an operation command.

The controller includes first to third loss estimating units and a voltage command value generating unit. The first loss estimating unit estimates power loss at the DC power source based on a preset loss characteristic. The second loss estimating unit estimates power loss at the converter based on a preset loss characteristic. The third loss estimating unit estimates power loss at the inverter based on a preset loss characteristic. The voltage command value generating unit calculates the minimum necessary voltage in correspondence with the induction voltage of the electric motor, establishes a DC voltage on the DC power line that minimizes total power loss including a sum of power losses estimated by the first to third loss estimating units, within a candidate voltage range not smaller than the minimum necessary voltage and not larger than an output upper limit voltage of the converter, and sets the voltage command value in accordance with the established DC voltage.

Alternatively, the present invention provides a method of controlling the electric motor drive control system including the DC power source, the converter and the inverter as described above, including the steps of: estimating power loss at the DC power source based on a preset loss characteristic; estimating power loss at the converter based on a preset loss characteristic; estimating power loss at the inverter based on a preset loss characteristic; calculating a minimum necessary voltage in correspondence with an induction voltage of the electric motor, based on a state of operation of the electric motor; establishing a DC voltage on the DC power line that minimizes total power loss including a sum of the estimated power losses, within a candidate voltage range not smaller than the minimum necessary voltage and not larger than an output upper limit voltage of the converter; and setting the voltage command value in accordance with the established DC voltage.

Preferably, the controller further includes a fourth loss estimating unit for estimating power loss at the electric motor based on a preset loss characteristic. The voltage command value generating unit calculates the total power loss based on a sum of the power losses estimated by the first to fourth loss estimating units, establishes the DC voltage that minimizes the total power loss in the candidate voltage range and sets the voltage command value in accordance with the established DC voltage.

Alternatively, the method of control further includes the step of estimating power loss at the electric motor based on a preset loss characteristic. In the step of establishing, the total power loss is calculated based on a sum of estimated power loss at the DC power source, power loss at the converter, power loss at the inverter and power loss at the electric motor, and the DC voltage that minimizes the total power loss in the candidate voltage range is established.

According to the electric motor drive control system and the control method thereof described above, in a structure including a converter configured to allow boosting of the DC power voltage and an inverter converting the output voltage of the converter to an AC voltage for controlling driving of the electric motor, the output voltage command value of the converter can be set in a range higher than an induction voltage of the electric motor and in correspondence with an optimal voltage that minimizes total power loss in the overall system, based on the estimated power loss in each of the DC power source, the converter (the electric motor), and the inverter. Accordingly, the overall efficiency of the system can be improved, by appropriately setting the output voltage of the converter.

Preferably, switching control of the inverter is executed by selecting one control method from a plurality of control methods; and the third loss estimating unit estimates power loss at the inverter, in accordance with rotation number (i.e. rotation speed) and torque of the electric motor and with the selected control method, based on the loss characteristic set for each of the control methods. Alternatively, in the step of estimating power loss at the inverter, power loss at the inverter is estimated in accordance with rotation number (i.e. rotation speed) and torque of the electric motor and with the selected control method, based on the loss characteristic set for each of the control methods.

Accordingly, in the control structure in which the method of control of the inverter is switched in accordance with the operation state of the electric motor, power loss of the system as a whole can more accurately be estimated, reflecting difference in power loss characteristics of the inverter dependent of different methods of control. Therefore, the output voltage of the converter can more accurately be set for improving overall system efficiency.

More preferably, the plurality of control methods include sinusoidal pulse width modulation control in which switching control on the inverter is executed such that voltage of each phase applied to the electric motor becomes a voltage with pulse-width-modulated waveform in accordance with the voltage command value, overmodulation pulse width modulation control in which switching control on the inverter is executed such that voltage of each phase applied to the electric motor becomes a voltage with pulse-width-modulated waveform with higher modulation factor than in the sinusoidal pulse width modulation control, and rectangular wave voltage control in which switching control on the inverter is executed such that voltage of each phase applied to the electric motor becomes a voltage with rectangular wave in accordance with the voltage command value.

Accordingly, in the control structure in which the method of control of the inverter is switched among sinusoidal pulse width modulation, pulse width overmodulation and rectangular wave voltage control, the overall system efficiency can be improved by appropriately setting the output voltage of the converter.

Preferably, the loss characteristic represents variation in the power loss with respect to at least one of rotation number (i.e. rotation speed) and torque of the electric motor and DC voltage on the DC power line.

Accordingly, by setting the rotation speed and torque of the electric motor and power loss characteristic with respect to the output voltage of the converter, in each of the DC power source, the converter, the inverter and the electric motor, change in total power loss of the system as a whole in accordance with the output voltage of the converter can more reliably be estimated. Therefore, the output voltage of the converter can more appropriately be set to improve the overall system efficiency.

Therefore, a main advantage of the present invention is that, in an electric motor drive control system of a structure including a converter formed to allow variable control of a DC voltage and an inverter converting an output voltage of the converter to an AC voltage, power loss in the system as a whole can be minimized and the overall efficiency can be improved by appropriately setting the output voltage of the converter.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows methods of controlling the inverter used in the electric motor drive control system of FIG. 1.

DESCRIPTION OF THE PREFERRED EMBODIMENTS

Figure 1:
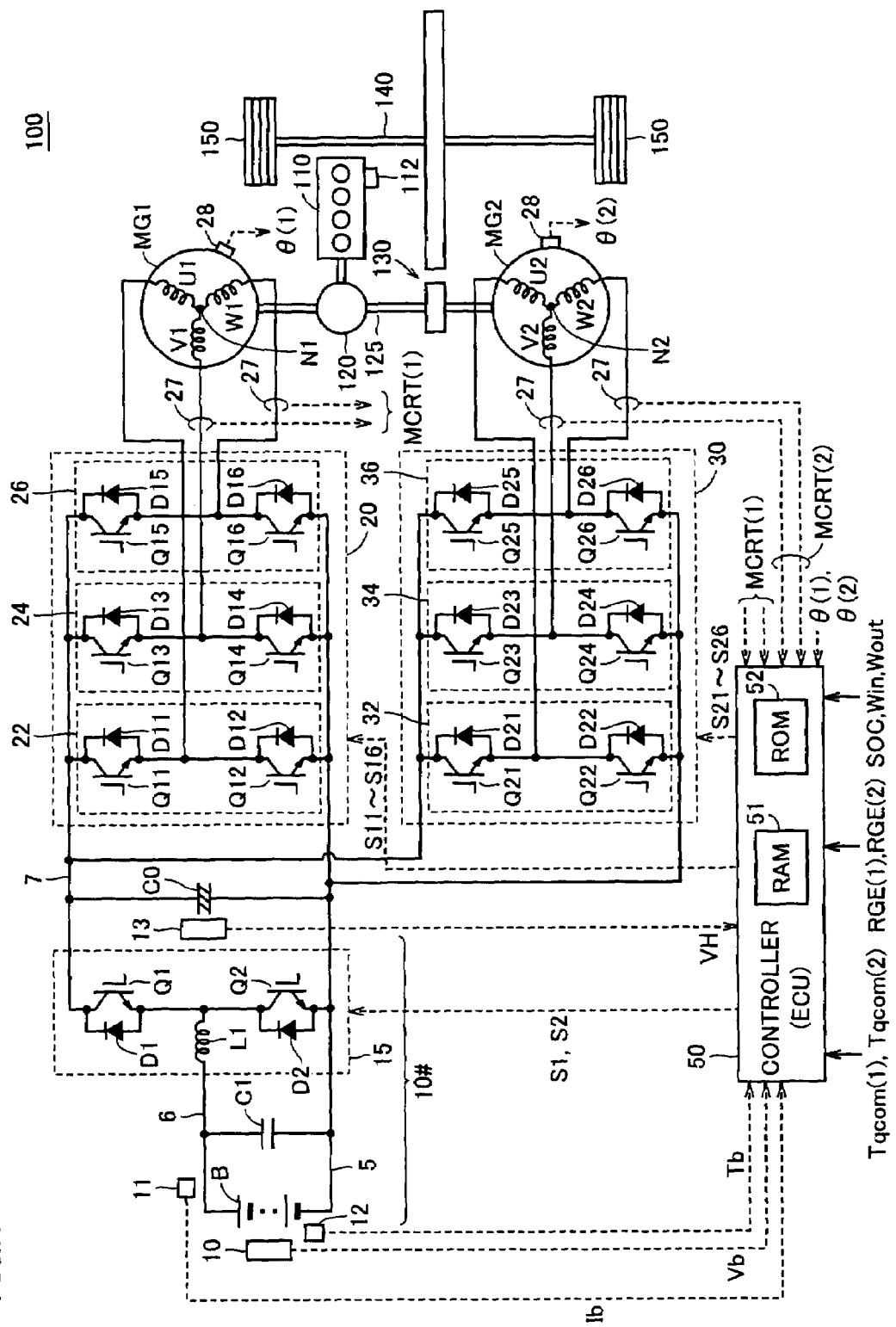
FIG. 1 is a block diagram showing a configuration of a hybrid vehicle as an example of the configuration on which the electric motor drive control system in accordance with an embodiment of the invention is mounted.

In the following, embodiments of the present invention will be described in detail with reference to the figures. Throughout the figures, the same or corresponding portions are denoted by the same reference characters and, basically, description thereof will not be repeated.

FIG. 1 is a block diagram showing a configuration of a hybrid vehicle 100 as an example of the configuration on which the electric motor drive control system in accordance with an embodiment of the invention is mounted.

Referring to FIG. 1, hybrid vehicle 100 includes an engine 110, a power split mechanism 120, motor generators MG1 and MG2, a reduction gear 130, a driving shaft 140 and wheels (driving wheels) 150. Hybrid vehicle 100 further includes a DC voltage generating unit 10#, a smoothing capacitor C0, inverters 20 and 30, and a controller 50, for controlling driving of motor generators MG1 and MG2.

Engine 110 is implemented, for example, by an internal combustion engine such as a gasoline engine or a diesel engine. A water temperature sensor 112 detecting temperature of cooling water is provided on engine 110. An output of water temperature sensor 112 is transmitted to controller 50.

Power split mechanism 120 is formed to allow distribution of power generated by engine 110 to a path to driving shaft 140 and to a path to motor generator MG1. A planetary gear mechanism having three rotation shafts of a sun gear, a planetary gear and a ring gear may be used as the power split mechanism 120. By way of example, it is possible to mechanically connect engine 110 and motor generators MG1 and MG2 to power split mechanism 120 by making the rotor of motor generator MG1 hollow and passing a crank shaft of engine 110 through the center thereof. Specifically, the rotor of motor generator MG1 is connected to the sun gear, the output shaft of engine 110 is connected to the planetary gear, and the output shaft 125 is connected to the ring gear. Output shaft 125, which is also connected to a rotation shaft of motor generator MG2, is connected to driving shaft 140 for driving rotation of driving wheels 150 through reduction gear 130. A reduction gear corresponding to the rotation shaft of motor generator MG2 may further be incorporated.

Motor generator MG1 is formed to have functions of a motor and a generator, to operate as a generator driven by engine 110 and as a motor that can start the operation of engine 110.

Similarly, motor generator MG2 is incorporated in hybrid vehicle 100 for generating power to drive the vehicle, of which output is transmitted through output shaft 125 and reduction gear 130 to driving shaft 140. Further, motor generator MG2 is formed to have the functions of a motor and a generator, to generate an output torque in the direction opposite to the rotation of wheels 150, thereby to regenerate electric power.

Next, a structure for controlling driving of motor generators MG1 and MG2 will be described.

DC voltage generating unit 10# includes a battery B for driving the vehicle (hereinafter also referred to as "main battery B"), a smoothing capacitor C1, and a step-up/down converter 15. Main battery B corresponds to the "DC power source" of the present invention, and step-up/down converter 15 corresponds to the "converter" of the present invention.

Nickel hydride or lithium ion secondary battery may be used as main battery B. In the embodiment below, a structure in which main battery B implemented by a secondary battery is used as the "DC power source" will be described. It is noted, however, that an electric storage such as an electric double layer capacitor may be used in place of main battery B.

A battery voltage Vb output by main battery B is detected by a voltage sensor 10, and a battery current Ib input to/output from main battery B is detected by a current sensor 11. A temperature sensor 12 is provided on main battery B. Temperature of main battery B, however, may vary locally. Therefore, temperature sensors 12 may be provided on a plurality of portions of main battery B. Battery voltage Vb, battery current Ib and battery temperature Tb detected by voltage sensor 10, current sensor 11 and temperature sensor 12 are output to controller 50.

Smoothing capacitor C1 is connected between a ground line 5 and a power supply line 6. Between a positive electrode terminal of main battery B and power supply line 6 and between a negative electrode terminal of main battery B and ground line 5, relays (not shown) are provided, which are turned on when the vehicle is in operation and turned off when the operation of the vehicle stops.

Step-up/down converter 15 (hereinafter also simply referred to as a converter) includes a reactor L1 and power semiconductor switching elements Q1 and Q2 (hereinafter referred to as "switching elements"), of which switching is controlled. Reactor L1 is connected between a connection node of switching elements Q1 and Q2 and power supply line 6. Smoothing capacitor C0 is connected between power supply line 7 and ground line 5.

Switching elements Q1 and Q2 are connected in series between power supply line 7 and ground line 5. On/off of switching elements Q1 and Q2 is controlled by switching control signals S1 and S2 from controller 50.

In the embodiment of the present invention, as the switching element, an IGBT (Insulated-Gate Bipolar Transistor), a power MOS (Metal Oxide Semiconductor) transistor, or a power bipolar transistor may be used. Anti-parallel diodes D1 and D2 are arranged for switching elements Q1 and Q2.

DC voltage sides of inverters 20 and 30 are connected to converter 15 through common ground line 5 and power supply line 7. Specifically, power supply line 7 corresponds to the "DC power line" of the present invention. Further, motor generators MG1 and MG2 correspond to the "electric motors" of the present invention, and inverters 20 and 30 correspond to the "inverters" of the present invention.

Inverter 20 is formed of a U-phase arm 22, a V-phase arm 24 and a W-phase arm 26 provided in parallel between power supply line 7 and ground line 5. The arm of each phase is implemented by switching elements connected in series between power supply line 7 and ground line 5. For example, U-phase arm 22 includes switching elements Q11 and Q12, V-phase arm 24 includes switching elements Q13 and Q14, and W-phase arm 26 includes switching elements Q15 and Q16. Further, anti-parallel diodes D11 to D16 are connected to switching elements Q11 to Q16, respectively. On/off of switching elements Q11 to Q16 is controlled by switching control signals S11 to S16 from controller 50, respectively.

Motor generator MG1 includes a U-phase coil U1, a V-phase coil V1 and a W-phase coil W1, provided on a stator, and a rotor, not shown. U-phase coil U1, V-phase coil V1 and W-phase coil W1 have one end connected together at a neutral point N1, and have the other end connected to U-phase arm 22, V-phase arm 24 and W-phase arm 26 of inverter 20, respectively. Inverter 20 performs bi-directional power conversion between DC voltage generating unit 10# and motor generator MG1, through on/off control (switching control) of switching elements Q11 to Q16 in response to switching control signals S11 to S16 from controller 50.

Specifically, in accordance with switching control by controller 50, inverter 20 may convert the DC voltage received from power supply line 7 to a 3-phase AC voltage, and output the converted 3-phase AC voltage to motor generator MG1. Consequently, motor generator MG1 is driven to generate a designated torque. Further, in accordance with the switching control by controller 50, inverter 20 may convert the 3-phase AC voltage generated by motor generator MG1 receiving an output of engine 110 to a DC voltage and output the converted DC voltage to power supply line 7.

Inverter 30 has a structure similar to inverter 20, and includes switching elements Q21 to Q26, of which on/off is controlled by switching control signals S21 to S26, and anti-parallel diodes D21 to D26.

Motor generator MG2 has a structure similar to motor generator MG1, and includes a U-phase coil U2, a V-phase coil V2 and a W-phase coil W2 provided on a stator, and a rotor, not shown. Similar to motor generator MG1, U-phase coil U2, V-phase coil V2 and W-phase coil W2 have one end connected together at a neutral point N2, and have the other end connected to U-phase arm 32, V-phase arm 34 and W-phase arm 36 of inverter 30, respectively.

Inverter 30 performs bi-directional power conversion between DC voltage generating unit 10# and motor generator MG2, through on/off control (switching control) of switching elements Q21 to Q26 in response to switching control signals S21 to S26 from controller 50.

Specifically, in accordance with switching control by controller 50, inverter 30 may convert the DC voltage received from power supply line 7 to a 3-phase AC voltage, and output the converted 3-phase AC voltage to motor generator MG2. Consequently, motor generator MG2 is driven to generate a designated torque. Further, in accordance with the switching control by controller 50, inverter 30 may convert the 3-phase AC voltage generated by motor generator MG2 receiving rotational force of wheel 150 at the time of regenerative braking of the vehicle to a DC voltage and output the converted DC voltage to power supply line 7.

The regenerative braking here refers to braking with regeneration through a foot brake operation by a driver of the hybrid vehicle, or deceleration (or stopping acceleration) of the vehicle while regenerating power, by releasing the accelerator pedal during running, without operating the foot brake.

Each of motor generators MG1 and MG2 is provided with a current sensor 27 and a rotation angle sensor (resolver) 28. As the sum of instantaneous values of 3-phase currents iu, iv and iw is zero, what is necessary is simply to arrange the current sensors 27 to detect motor currents of two phases only (for example, V-phase current iv and W-phase current iw), as shown in FIG. 1. Rotation angle sensor 28 detects a rotation angle $\theta$ of the rotor, not shown, of motor generators MG1 and MG2, and transmits the detected rotation angle $\theta$ to controller 50. Based on the rotation angle $\theta$, the number of rotations Nmt (angular velocity $\omega$) of motor generators MG1 and MG2 may be calculated by controller 50. In the present embodiment, the term "number of rotations" refers to the number of rotations per unit time (typically, per one minute), or rotation speed, unless specified otherwise.

Motor current MCRT(1) and rotor rotation angle $\theta(1)$ of motor generator MG1 as well as motor current MCRT(2) and rotor rotation angle $\theta(2)$ of motor generator MG2 detected by these sensors are input to controller 50. Further, controller 50 receives, as inputs, a torque command value Tqcom(1) and a control signal RGE(1) representing a regenerative operation of motor generator MG1 as well as a torque command value Tqcom(2) and a control signal RGE(2) representing a regenerative operation of motor generator MG2, as motor commands.

Controller 50 implemented by an electronic control unit (ECU) includes a microcomputer (not shown), an RAM (Random Access Memory) 51 and an ROM (Read Only Memory) 52, and generates, in accordance with a prescribed program processing, switching control signals S1 and S2 (converter 15), S11 to S16 (inverter 20) and S21 to S26 (inverter 30) for switching control of converter 15 and inverters 20 and 30, such that motor generators MG1 and MG2 operate in accordance with a motor command input from the electronic control unit (ECU) of a higher order.

Further, information related to main battery B, such as SOC (state of charge) and allowable power amounts Win and Wout representing charge/discharge limitation, is input to controller 50. Specifically, controller 50 has a function of limiting, as needed, the power consumption and the power generation (regenerative power) of motor generators MG1 and MG2, so that excessive charge or excessive discharge of DC power source B can be avoided.

Though a mechanism of switching the switching frequency through inverter control by a single controller (ECU) has been described in the present embodiment, a similar control structure may be implemented by a cooperation of a plurality of controllers (ECUs).

Next, operations of converter 15 and inverters 20 and 30 for controlling driving of motor generators MG1 and MG2 will be described.

In a voltage boosting (step-up) operation of converter 15, controller 50 sets a voltage command value VH# (hereinafter also referred to as "system voltage command value VH#") of a DC voltage VH (the DC voltage corresponding to the DC side voltage of inverters 20 and 30, hereinafter also referred to as "system voltage VH") based on the state of operations of motor generators MG1 and MG2, and based on the system voltage command value VH# and the detected value of a voltage sensor 13, generates switching control signals S1 and S2 such that the output voltage of converter 15 becomes equal to the system voltage command value VH#.

At the time of a step-up operation, converter 15 commonly supplies the system voltage VH obtained by boosting the DC voltage (battery voltage) Vb supplied from main battery B to inverters 20 and 30. More specifically, in response to switching control signals S1 and S2 from controller 50, duty ratio (ratio of on period) of switching elements Q1 and Q2 is set, and the voltage-up ratio is in correspondence with the duty ratio.

At the time of a step-down operation, converter 15 lowers the DC voltage (system voltage) supplied from inverters 20, 30 through smoothing capacitor C0 and charges main battery B. Specifically, in response to switching control signals S1 and S2 from controller 50, a period in which only the switching element Q1 is on and a period in which both switching elements Q1 and Q2 are off are provided alternately, and the voltage-down ratio is in correspondence with the duty ratio of the on-period mentioned above.

Smoothing capacitor C0 smoothes the DC voltage (system voltage) from converter 15, and supplies the smoothed DC voltage to inverters 20 and 30. Voltage sensor 13 detects the voltage at opposite ends of smoothing capacitor C0, that is, the system voltage VH, and outputs the detected value to controller 50.

Inverter 30 drives motor generator MG2 such that a torque in accordance with the torque command value Tqcom(2) is output, through on/off operations (switching operations) of switching elements Q21 to Q26 in response to switching control signals S21 to S26 from controller 50. The torque command value Tqcom(2) is set to a positive value (Tqcom(2)>0), zero (Tqcom(2)=0) or a negative value (Tqcom(2)<0) appropriately in accordance with a request of output (toque× number of rotations) to motor generator MG2, in accordance with the state of operation.

Particularly at the time of regenerative braking of a hybrid vehicle, the torque command value of motor generator MG2 is set to a negative value (Tqcom(2)<0). In this case, inverter 30 converts the AC voltage generated by motor generator MG2 to a DC voltage by a switching operation in response to switching control signals S21 to S26, and supplies the converted DC voltage (system voltage) through smoothing capacitor C0 to converter 15.

Further, similar to the operation of inverter 30, inverter 20 converts power so that motor generator MG1 operates in accordance with the command value, by on/off control of switching elements Q11 to Q16 in accordance with switching control signals S11 to S16 from controller 50.

By the driving control of motor generators MG1 and MG2 in accordance with torque command values Tqcom(1) and Tqcom(2) by controller 50, in hybrid vehicle 100, generation of power for driving the vehicle through power consumption by motor generator MG2, generation of power for charging main battery B through generation of power by motor generator MG1 or generation of power to be consumed by motor generator MG2, and generation of power for charging main battery B through regenerative braking operation (power generation) by motor generator MG2 may be executed appropriately in accordance with the state of operation of the vehicle.

Next, power conversion control of inverters 20 and 30 by controller 50 will be described in detail. The inverter control described in the following is common to inverters 20 and 30.

FIG. 2 illustrates the inverter control method used in the electric motor drive control system shown in FIG. 1.

As shown in FIG. 2, in the electric motor drive control system in accordance with an embodiment of the present invention, three methods of control are used switched from one another for the electric motor drive control by inverters 20 and 30.

Sinusoidal PWM (pulse width modulation) control is used as general PWM control, in which on/off of a switching element at the arm of each phase is controlled in accordance with a comparison in voltage between a sinusoidal voltage command value and a carrier wave (typically, a triangular wave). As a result, for a set of a high-level period that corresponds to the on period of an upper arm element and a low-level period that corresponds to the on period of a lower arm element, the duty ratio is controlled such that the fundamental wave component thereof comes to be a sinusoidal wave within a prescribed period. As is well known, in the sinusoidal PWM control, the amplitude of fundamental wave component can be increased only to 0.61 times that of the DC side voltage (that is, system voltage VH) of the inverter.

In rectangular wave voltage control, one pulse of rectangular wave having the ratio of high-level to low-level period of 1:1 is applied to motor generator MG within the prescribed time period mentioned above. Thus, the modulation factor can be increased to 0.78.

In overmodulation PWM control, PWM control similar to the sinusoidal PWM control is performed with the carrier wave distorted to have smaller amplitude. As a result, the fundamental wave component can be distorted, and the modulation factor can be improved to the range of 0.61 to 0.78.

In motor generator MG (generally representing MG1 and MG2, same in the following), when the number of rotations and/or torque increases, back electromotive force increases and induction voltage becomes higher, so that necessary voltage increases. Accordingly, it becomes necessary to set the output voltage (system voltage VH) of converter 15 to be higher than the necessary voltage. On the other hand, boosting of converter 15 is limited, and there is an upper limit (that is, maximum system voltage) in the output voltage thereof.

Therefore, in a range where the necessary voltage (induction voltage) is lower than the maximum system voltage, the maximum torque control through sinusoidal PWM control or overmodulation PWM control is applied, and the output torque is adjusted to the torque command value Tqcom by the motor current control in accordance with the vector control.

On the other hand, if the necessary voltage of the motor (induction voltage) attains to the maximum system voltage, rectangular wave voltage control that corresponds to the field weakening control is applied while the system voltage VH is maintained. In the rectangular wave voltage control method, the amplitude of the fundamental wave component is fixed, and therefore, torque control is effected through voltage phase control of the rectangular wave pulse.

When the same motor current is supplied while the system voltage VH is the same, that is, the DC current switched by the inverter 20 or 30 is the same, switching loss at the inverter depends on the number of switching per unit time. Therefore, under such same conditions, switching loss is the largest in sinusoidal PWM control, smallest in the rectangular wave voltage control, and the middle in overmodulation PWM control.

Figure 3:
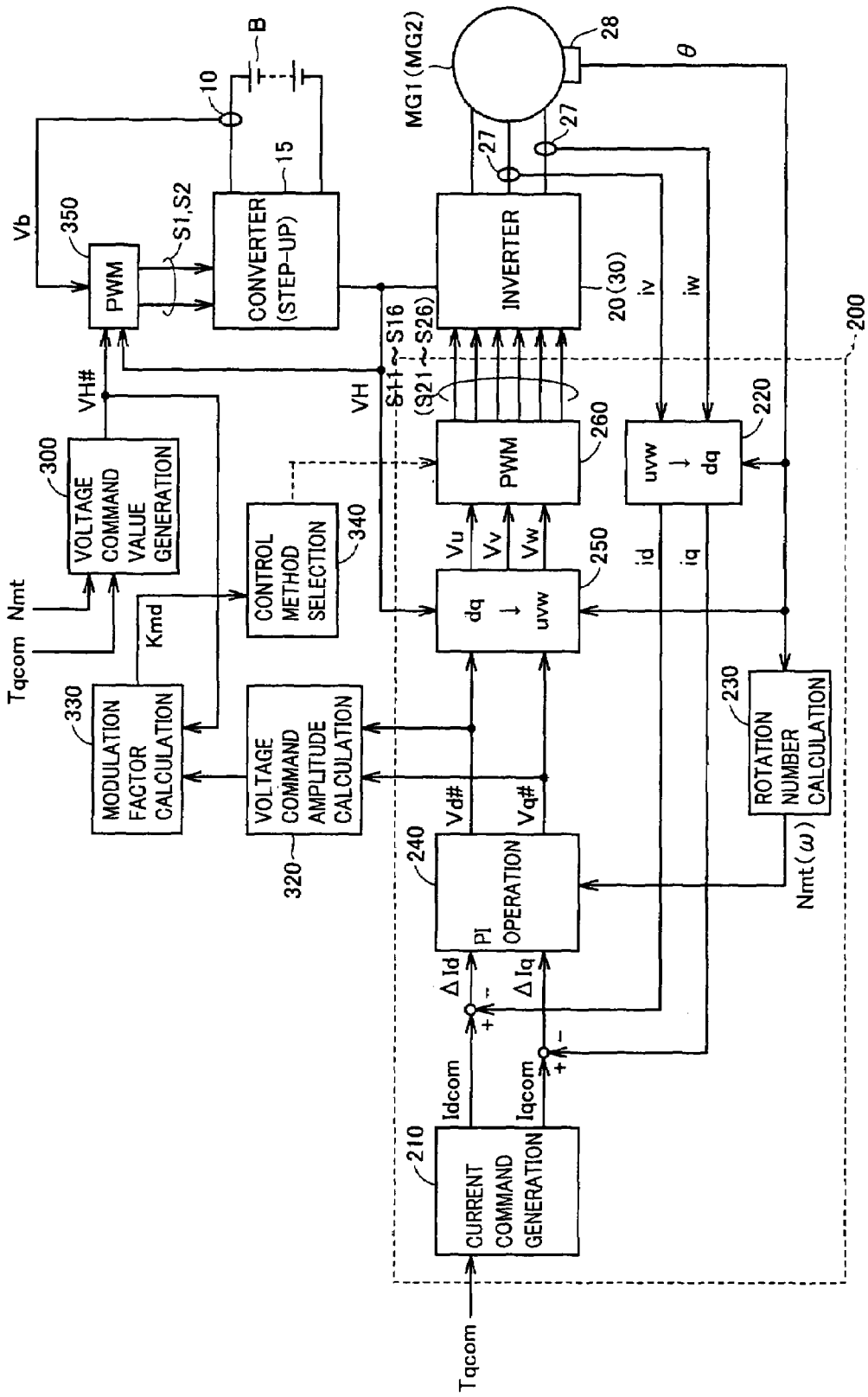
FIG. 3 is a control block diagram of sinusoidal PWM control and overmodulation PWM control.

FIG. 3 shows a control block in accordance with the sinusoidal PWM control method and overmodulation PWM control method. The electric motor control in accordance with the block diagram of FIG. 3 is implemented by executing a program stored in advance in controller 50 in a prescribed period.

Referring to FIG. 3, PWM control block 200 includes a current command generating unit 210, coordinate converting units 220 and 250, a rotation number calculating unit 230, a PI operating unit 240, and a PWM signal generating unit 260.

Current command generating unit 210 generates a d-axis current command value Idcom and a q-axis current command value Iqcom in accordance with a torque command value Tqcom (generally representing Tqcom(1) and Tqcom(2), same in the following), with reference to a map or the like formed beforehand.

Coordinate converting unit 220 calculates the d-axis current iq and q-axis current iq based on V phase current iv and W phase current iw detected by current sensor 27, by coordinate conversion (three-phase→two-phase) using rotation angle θ of motor generator MG detected by rotation angle sensor 28. Based on the output from rotation angle sensor 28, rotation number calculating unit 230 calculates the number of rotations Nmt (or rotational angular velocity ω)) of motor generator MG.

To PI operating unit 240, a deviation ΔId(ΔId=Idcom−id) with respect to the command value of d-axis current and a deviation ΔIq(ΔIq=Iqcom−Iq) with respect to the command value of the q-axis current are input. PI operating unit 240 calculates control deviation by PI operation with a prescribed gain, on each of d-axis current deviation ΔId and q-axis current deviation ΔIq, and generates a d-axis voltage command value Vd# and a q-axis voltage command value Vq#, in accordance with the control deviation.

Command converting unit 250 converts d-axis voltage command value Vd# and q-axis voltage command value Vq# to voltage command values Vu, Vv and Vw of respective ones of U, V and W phases, through voltage conversion (two-phase→three-phase), using rotation angle θ of motor generator MG. System voltage VH is also reflected on the conversion from d-axis and q-axis voltage command values Vd# and Vq# to voltage command values Vu, Vv and Vw of respective phases.

PWM signal generating unit 260 generates switching control signals S11 to S16 (S21 to S26) shown in FIG. 1, based on the comparison between a prescribed carrier wave and the voltage command values Vu, Vv and Vw of respective phases.

As the switching of inverter 20 (30) is controlled in accordance with switching control signals S11 to S16 (S21 to S26)

generated by PWM control block 200, an AC voltage for outputting a torque in accordance with the torque command value Tqcom is applied to motor generator MG. As described above, when overmodulation PWM control method is applied, the carrier wave used at the time of PWM at PWM signal generating unit 260 is switched from the general one used when sinusoidal wave PWM control method is applied.

As described above, in the selection among sinusoidal PWM control method, overmodulation PWM control method and rectangular wave control method, modulation factor is considered. Therefore, in the electric motor drive control system in accordance with the embodiment of the present invention, a voltage command value generating unit 300, a voltage command amplitude calculating unit 320, a modulation factor calculating unit 330 and a control method selecting unit 340 are further provided, in order to select the control method in accordance with the required modulation factor.

Voltage command value generating unit 300 sets the voltage command value VH# of system voltage VH in accordance with the state of operation (torque, number of rotations) of motor generator MG1, MG2. The voltage command value VH# will be described in detail later.

Voltage command amplitude calculating unit 320 calculates a line voltage amplitude Vamp in accordance with equations (1) and (2) below, using d-axis voltage command value Vd# and q-axis voltage command value Vq# generated by PI calculating unit 240, as well as a voltage phase φ (voltage phase with d-axis being the reference).

$$Vamp=|Vd\#|\cdot\cos\phi+|Vq\#|\cdot\sin\phi \quad (1)$$

$$\tan\phi=Vq\#/Vd\# \quad (2)$$

Modulation factor calculating unit 330 calculates the actual modulation factor in accordance with equation (3) below, from the line voltage amplitude Vamp calculated by voltage command amplitude calculating unit 320 and from the voltage command value VH# of system voltage.

$$Kmd=Vamp/VH\# \quad (3)$$

Control method selecting unit 340 selects a method of control that can attain the modulation factor Kmd calculated by modulation factor calculating unit 330 from among sinusoidal PWM control, overmodulation PWM control and rectangular wave voltage control.

Based on the detected values of battery voltage Vb and system voltage VH detected by voltage sensors 10 and 13, PWM signal generating unit 350 generates switching control signals S1 and S2 in accordance with the prescribed PWM control method such that the output voltage of converter 15 becomes equal to the voltage command value VH#.

Figure 4:
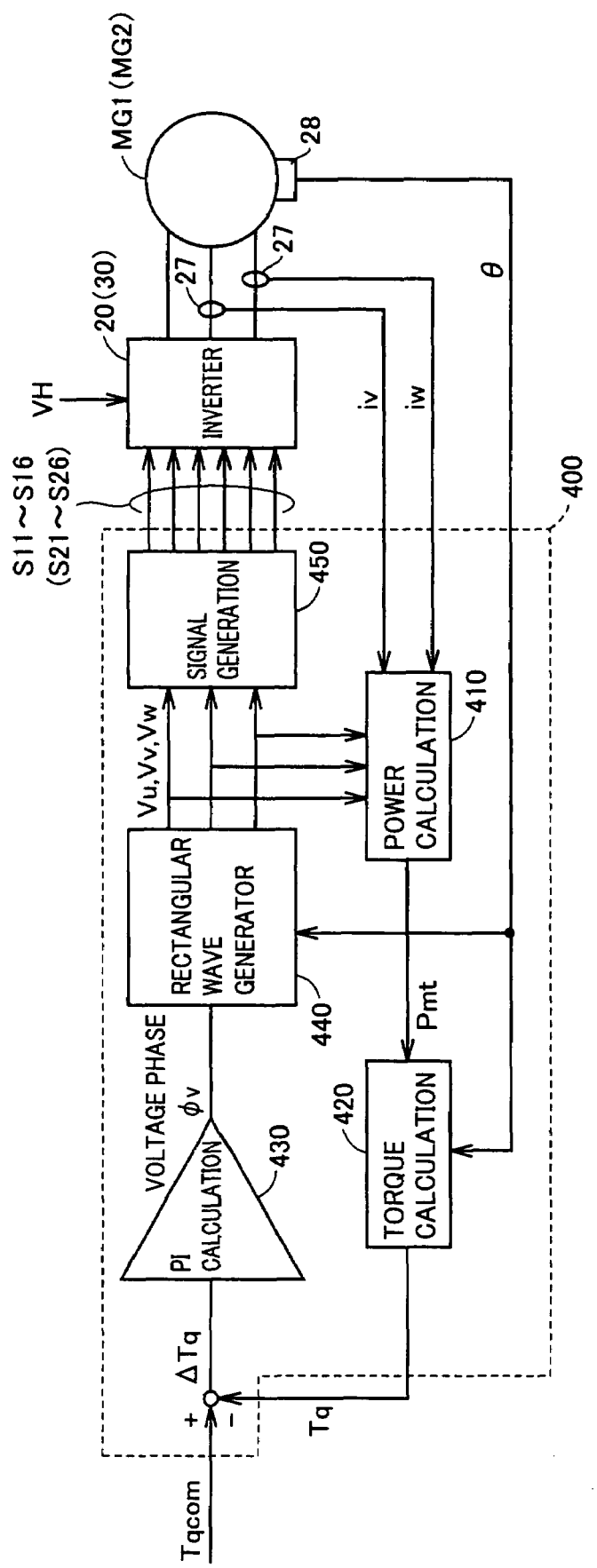
FIG. 4 is a control block diagram of rectangular wave control.

FIG. 4 is a control block diagram for the rectangular wave voltage control. As described above, the rectangular wave voltage control is selected when modulation factor Kmd calculated by modulation factor calculating unit 330 cannot be realized by overmodulation PWM control. The rectangular wave voltage control in accordance with the block diagram of FIG. 4 is also implemented by executing a program stored in advance in controller 50 at a prescribed period.

Referring to FIG. 4, rectangular wave voltage control block 400 includes a power calculating unit 410, a torque calculating unit 420, a PI calculating unit 430, a rectangular wave generator 440, and a signal generating unit 450.

Power calculating unit 410 calculates the motor supply power Pmt in accordance with equation (4), from currents of respective phases obtained by V-phase current iv and W-phase current iw of current sensor 27 and from voltages Vu, Vv and Vw of respective phases (U-phase, V-phase, W-phase).

$$Pmt=iu\cdot Vu+iv\cdot Vv+iw\cdot Vw \quad (4)$$

Torque calculating unit 420 calculates a torque estimation value Tq in accordance with equation (5) below, from motor power Pmt obtained by power calculating unit 410 and angular velocity ω calculated from rotation angle θ of motor generator MG detected by rotation angle sensor 28.

$$Tq=Pmt/\omega \quad (5)$$

To PI calculating unit 430, torque deviation ΔTq (ΔTq=Tqcom−Tq) with respect to the torque command value Tqcom is input. PI calculating unit 430 performs a PI operation with a prescribed gain on torque deviation ΔTq to find a control deviation, and in accordance with the obtained control deviation, sets the phase φv of rectangular wave voltage. Specifically, for positive torque generation (Tqcom>0), voltage phase φv is controlled such that the voltage phase is advanced when the torque is insufficient, and the voltage phase is retarded when the torque is excessive. For negative torque generation (Tqcom<0), voltage phase φv is controlled such that the voltage phase is retarded when the torque is insufficient, and the voltage phase is advanced when the torque is excessive.

Rectangular wave generator 440 generates voltage command values (rectangular wave pulses) Vu, Vv and Vw of respective phases, in accordance with the voltage phase φv set by PI calculating unit 430. Signal generating unit 450 generates switching control signals S11 to S16 (S21 to S26) in accordance with the voltage command values Vu, Vv and Vw of respective phases. As inverter 20 (30) performs the switching operation in accordance with switching control signals S11 to S16 (S21 to S26), rectangular wave pulses in accordance with the voltage phase φv are applied as voltages of respective phases of the motor.

As described above, when the rectangular wave control method is adopted, torque control of motor generator MG is realized by feedback control of the torque (power). It is noted, however, that in the rectangular wave control method, only the phase can be operated of voltage applied to the motor, and hence, control response is lower than the PWM control method in which both amplitude and phase of the voltage applied to the motor can be operated.

Next, setting of system voltage command value VH# as a characteristic point of the electric motor drive control system in accordance with the embodiment of the present invention will be described in detail.

Figure 5:
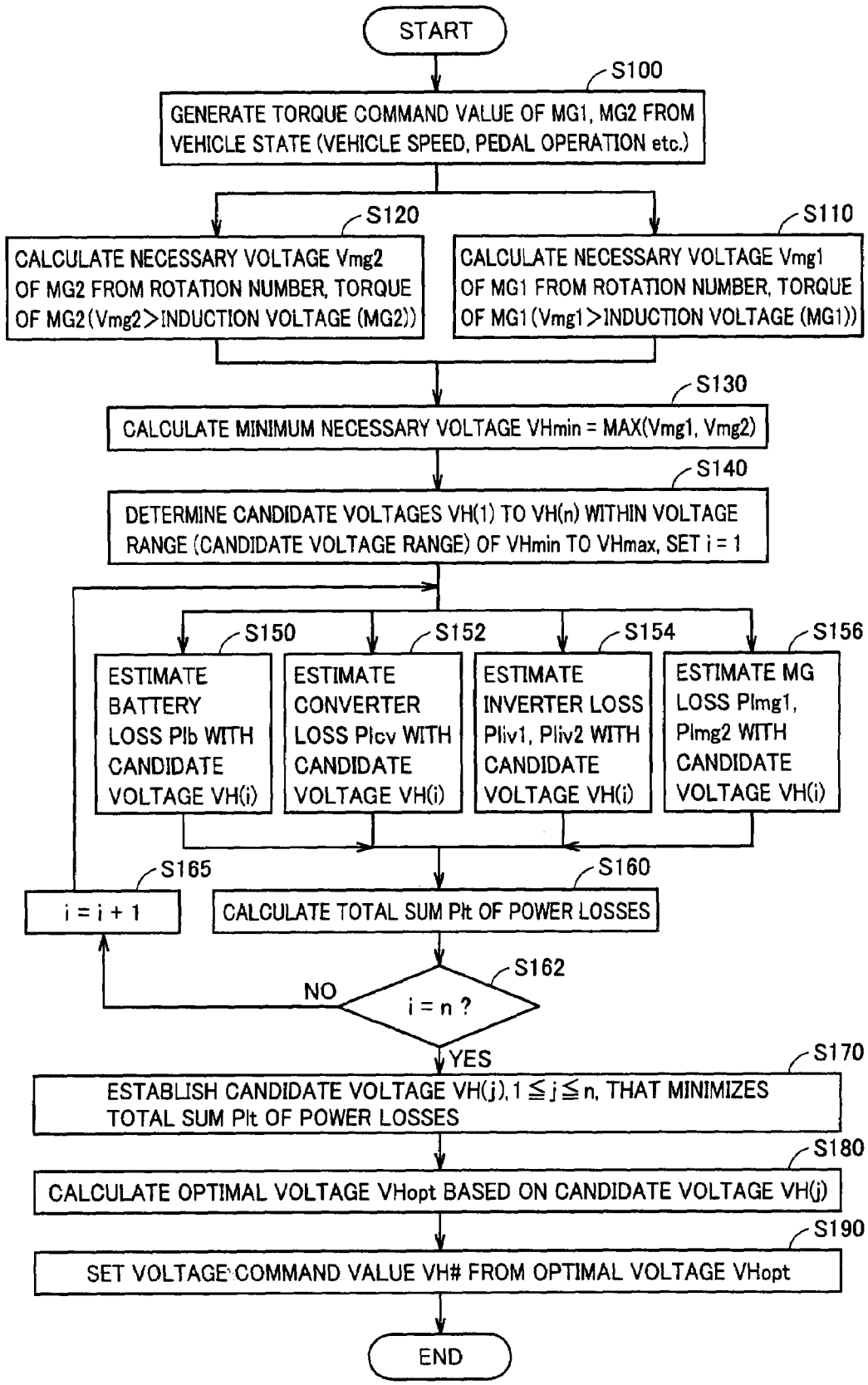
FIG. 5 is a flowchart representing setting of a system voltage command value in the electric motor drive control system in accordance with an embodiment of the present invention.

FIG. 5 is a flowchart representing the setting of system voltage command value in accordance with an embodiment of the present invention.

Referring to FIG. 5, at step S100, controller 50 sets torque command values Tqcom(1) and Tqcom(2) in accordance with output request (number of rotations×torque) to motor generator MG1, MG2, dependent on the vehicle state (vehicle speed, pedal operation and the like).

Further, at step S110, controller 50 calculates the necessary voltage Vmg1 that corresponds to the induction voltage of motor generator MG1, in accordance with the number of rotations of motor generator MG1 and the torque command value Tqcom(1). Similarly, at step S120, controller 50 calculates the necessary voltage Vmg2 that corresponds to the induction voltage of motor generator MG2, in accordance with the number of rotations of motor generator MG2 and the torque command value Tqcom(2).

Here, in motor generator MG, when the number of rotations and/or torque increases, back electromotive force increases, and induction voltage increases. Therefore, at steps S110 and S120, necessary voltages Vmg1 and Vmg2 are set to be not lower than the induction voltages of motor generators MG1 and MG2, respectively.

Figure 6:
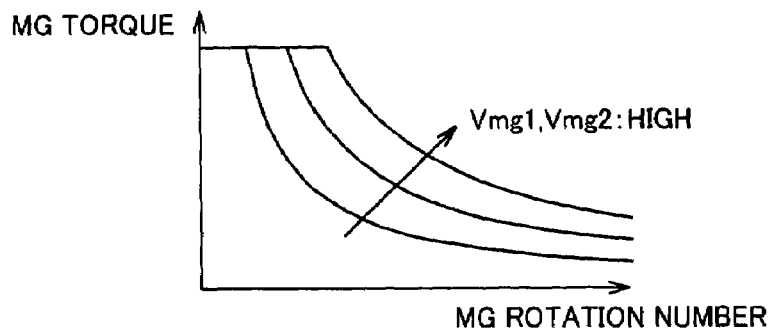
FIG. 6 is a schematic representation of the relation among torque and rotation speed of the motor generator and the necessary voltage (induction voltage).

Specifically, as shown in FIG. 6, in accordance with the torque and number of rotations of motor generator MG, specifically, as the operation goes to the high speed and high torque range, the necessary voltages Vmg1 and Vmg2 are set relatively higher. By way of example, calculation of necessary voltages Vmg1 and Vmg2 at steps S110 and S120 may be executed by making a reference to a map reflecting the characteristic shown in FIG. 6 for each of motor generators MG1 and MG2, using torque command value Tqcom and number of rotations Nmt as arguments.

Again referring to FIG. 5, at step S130, controller 50 calculates the minimum necessary voltage VHmin as the maximum value of necessary voltages Vmg1 for MG1 and Vmg2 for MG2 calculated at steps S110 and S120, respectively. Specifically, the minimum necessary voltage VHmin is set to be higher than the induction voltages of motor generators MG1 and MG2.

At step S140, controller 50 sets a plurality of candidate voltages VH(1) to VH(n) in a voltage range from the minimum necessary voltage VHmin found at step S130 to the maximum output voltage VHmax (hereinafter the voltage range will be also be referred to as the "candidate voltage range") of converter 15. Here, n is an integer not smaller than 2. As an initial value, variable i is set to i=1. Here, the number and/or voltage interval of candidate voltages VH(1) to VH(n) may be fixed or variably set in accordance with the state of operations of motor generators MG1 and MG2. Further, the voltage interval of candidate voltages VH(1) to VH(n) is not necessarily limited to an equal interval.

Further, at step S150, controller 50 estimates a power loss (battery loss) Plb at main battery B with candidate voltage VH(i). Similarly, at step S152, controller 50 estimates power loss (converter loss) Plcv with candidate voltage VH(i). Further, at step S154, controller 50 estimates power losses (inverter losses) Pliv1 and Pliv2 at inverters 20 and 30 with candidate voltage VH(i). Further, at step S156, controller 50 estimates power losses (MG losses) Plmg1 and Plmg2 at motor generators MG1 and MG2 with candidate voltage VH(i).

Controller 50 calculates total power loss Plt as the total sum of battery loss Plb, converter loss Plcv, inverter losses Pliv1, Pliv2 and MG losses Plmg1, Plmg2 estimated at steps S150, S152, S154 and S156, respectively (S 160). Then, controller 50 calculates the total sum Plt of power losses in the whole system for each of candidate voltages VH(1) to VH(n), by the repetition process of steps S162 and S165.

At step S170, controller 50 establishes the candidate voltage VH(j) with which the total sum of power losses Plt becomes the smallest, from candidate voltages VH(1) to VH(n). At step S180, controller 50 calculates the optimal voltage VHopt based on the candidate voltage VH(j). Here, the candidate voltage VH(j) may directly be used as the optimal voltage VHopt, or the optimal voltage VHopt may be calculated by interpolation of candidate voltage VH(j) and a neighboring candidate voltage VH(j−1) or VH(j+1).

Then, in accordance with the optimal voltage VHopt found at step S180, controller 50 sets the voltage command value VH# (step S190). Basically, it is set as VH#=VHopt. Thus, the system voltage command value VH# is set so that the system voltage VH that minimizes total power loss of the electric motor control system as a whole is attained.

Though not shown in the flowchart of FIG. 5, if the minimum necessary voltage VHmin calculated at step S130 is the same as the maximum output voltage VHmax of converter 15, there is no freedom in the system voltage VH, and therefore, the process of steps S140 to S190 is omitted, and the voltage command value VH# is set to VH#=VHmax (=VHmin).

Next, details of the power loss estimation at various components of the electric motor control system will be described in turn.

Battery loss Plb mainly comes from Joule loss caused by internal resistance, and is represented as $Ib \cdot r^2$, using internal resistance value r and battery current Ib.

Figure 7:
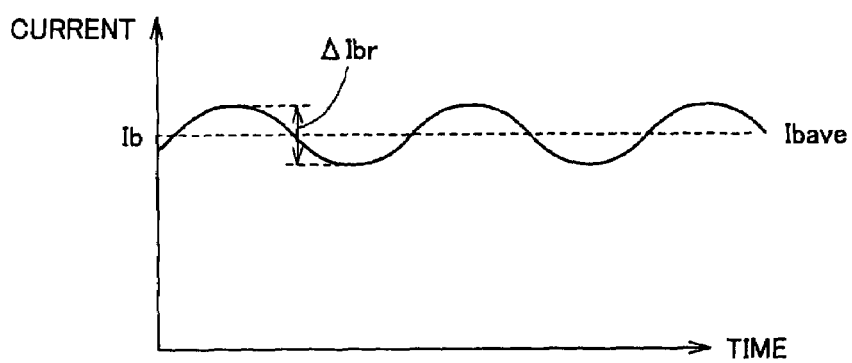
FIG. 7 is a schematic waveform diagram showing the form of battery current.

As shown in FIG. 7, battery current Ib is the average current (DC component) Ibave with ripple current (AC component) ΔIbr superposed thereon. The ripple current ΔIbr increases in accordance with a voltage difference |VH−Vb| between the system voltage VH and the battery voltage Vb.

Figure 8:
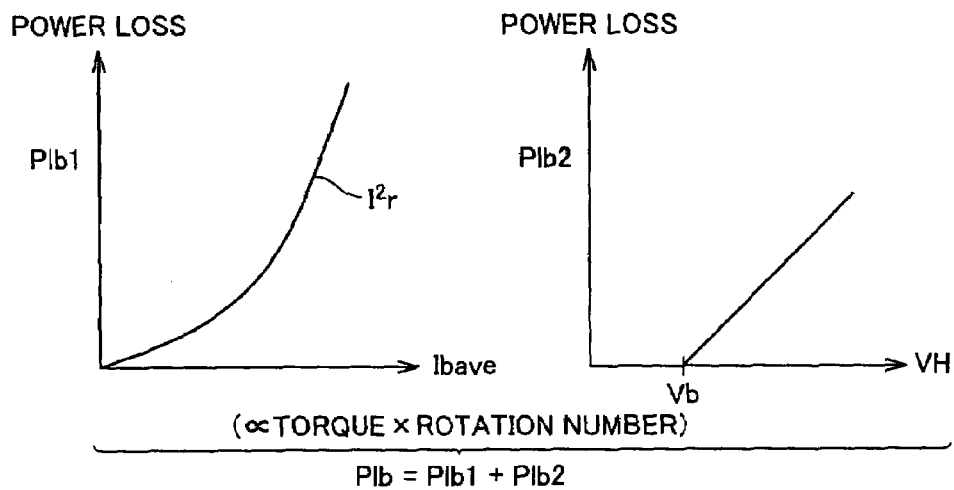
FIG. 8 is a schematic diagram illustrating battery loss variation characteristics.

As shown in FIG. 8, battery loss Plb is represented by the sum of power loss Plb1 in proportion to the square of average current (DC) Ibave and power loss Plb2 in proportion to the square of AC power component ΔIbr. Here, the power loss Plb2 derived from the ripple current increases as the voltage difference |VH−Vb| increases.

Therefore, battery loss Plb can be estimated based on the average battery current (DC) Ibave, that is, based on the state of operation of MG1, MG2 (torque×number of rotations) and the voltage difference |VH−Vb|.

Here, the input/output power to/from the battery represented as a product between the average current Ibave and battery voltage Vb corresponds to the total sum of power consumed or generated by each motor generator MG, and does not change dependent on the system voltage VH. Therefore, as the battery loss Plb to be evaluated in establishing the optimal value of voltage command value VH#, Plb2 should mainly be taken into consideration.

Accordingly, by forming, in advance, a map reflecting the characteristic shown in FIG. 8 with the voltage difference |VH−Vb| being the argument for the battery loss Plb, the change in battery loss Plb with respect to the candidate voltage VH(i) may be estimated.

The loss at converter 15 is mainly the sum of losses at switching elements Q1 and Q2 and loss at reactor L1, each of which becomes smaller when the current passing through the converter (that is, battery current Ib) becomes smaller and the system voltage VH becomes lower. When the ripple current ΔIbr increases, loss that depends on the square of the current increases, and hence, the voltage difference |VH−Vb| is one factor that determines the converter loss Plcv.

Figure 9:
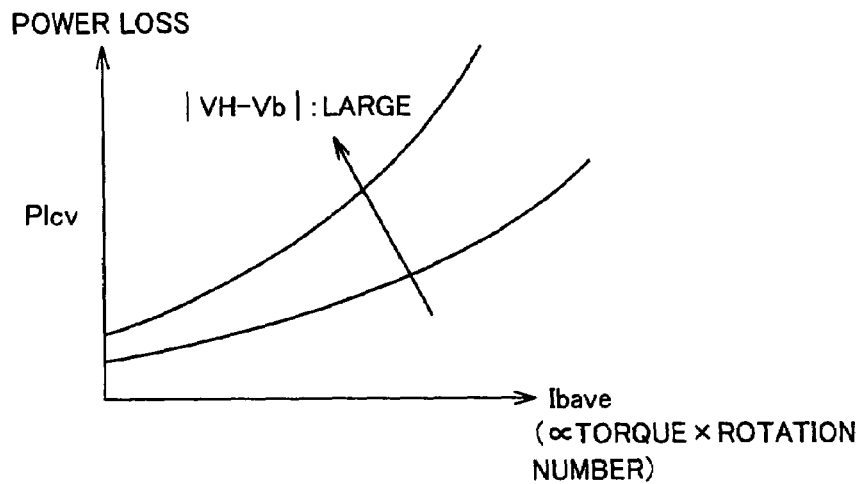
FIG. 9 is a schematic diagram illustrating converter loss variation characteristics.

Referring to FIG. 9, converter loss Plcv is basically in accordance with the square of battery current Ib. Therefore, as shown in FIG. 9, converter loss Plcv is basically in proportion to the square of average current Ibave of battery current Ib, and it increases as the voltage difference |VH−Vb| increases.

Therefore, converter loss Plcv can also be estimated based on the average battery current Ibave, that is, based on the state of operation of MG1, MG2 (torque×number of rotations) and the voltage difference |VH−Vb|. As described above, the average battery current Ibave does not change dependent on the system voltage VH. Therefore, as regards the converter loss Plcv to be evaluated to establish the optimal value of voltage command value VH#, by forming, in advance, a map reflecting the characteristic shown in FIG. 9 with the voltage difference |VH−Vb| being the argument, the change in converter loss Plcv with respect to the candidate voltage VH(i) may be estimated.

The inverter loss at inverters 20 and 30 mainly comes from on-loss and switching loss of the switching elements, and it becomes smaller as the current flowing through the switching elements is smaller and the system voltage is lower.

Figure 10:
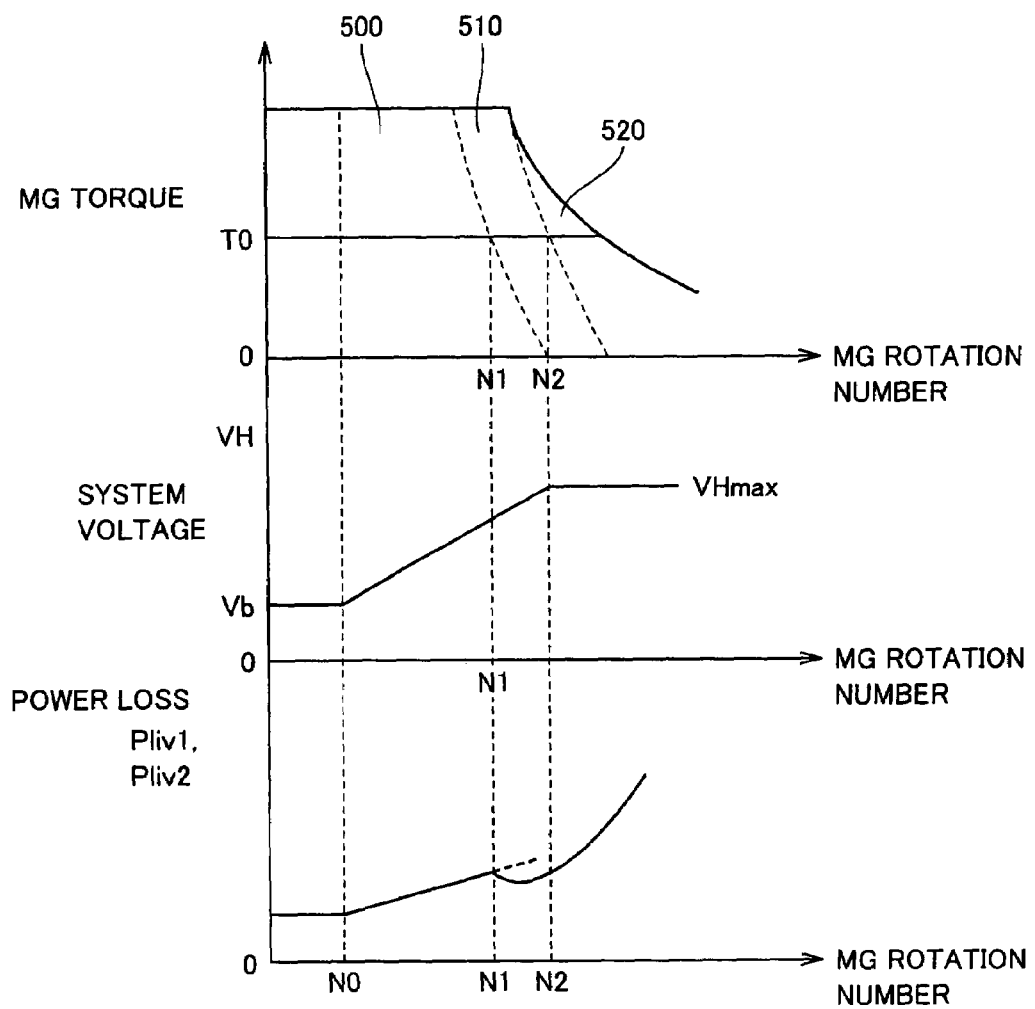
FIG. 10 is a schematic diagram illustrating inverter loss variation characteristics.

As shown in FIG. 10, the method of controlling electric motor by inverters 20 and 30 is such that in a range 500 of low number of rotations, sinusoidal PWM control is selected, in a range 510 where the number of rotations is increased and the larger modulation factor is required, overmodulation PWM control is selected, and in a range 520 of higher number of rotations, rectangular wave control is effected. By way of example, while a constant torque T1 is being output, control method is switched from sinusoidal PWM control to overmodulation PWM control as the number of rotations of MG increases and attains close to N1, and switched from overmodulation PWM control to rectangular wave voltage control as the number of rotations of MG further increases and attains close to N2.

At this time, when the system voltage VH is determined in correspondence with the minimum necessary voltage Vmin described above, the system voltage VH increases, as the number of rotations increases, from the battery voltage Vb to the maximum output voltage VHmax of converter 15. In the range where MG rotation number $\geq$N2, the minimum necessary voltage VHmin attains to the maximum output voltage VHmax, and therefore, degree of freedom in setting the system voltage VH is lost.

Here, as regards the inverter power loss Pliv1 (or Pliv2), in the range where the number of rotations of MG is from N0 to N1, that is, where sinusoidal PWM control is applied, the switching voltage of each switching element increases as the system voltage VH increases as long as the same torque (T1) is output, and therefore, switching loss increases. Accordingly, inverter loss Pliv1 (or Pliv2) increases.

When the number of rotations exceeds N1, however, the control method is switched from sinusoidal PWM control to overmodulation PWM control in which the number of switching operations per unit time is relatively small, whereby inverter loss Pliv1 (or Pliv2) decreases, though the system voltage VH further increases as the MG rotation number increases.

When the number of rotations further increases, inverter loss Pliv1 (or Pliv2) gradually increases as the switching loss at each switching element increases in accordance with the increase in system voltage VH. Further, in a range where the system voltage attains to the maximum output voltage VHmax of the converter and rectangular wave voltage control is applied, it becomes necessary to lower inverter efficiency through field weakening control to suppress induction voltage at motor generator MG. Therefore, though the number of switching operations per unit time decreases, inverter loss Pliv1 (or Pliv2) gradually increases.

The MG loss in motor generators MG1 and MG2 is a sum of copper loss caused by the current flowing through coils of respective phases, and iron loss generated by flux change at the iron core portion. Therefore, MG loss is smaller as the current flowing through the coils of respective phases is smaller.

Therefore, generally, MG loss at motor generators MG1 and MG2 may be estimated based on the state of operation (number of rotations and torque) of the motor.

Figure 11:
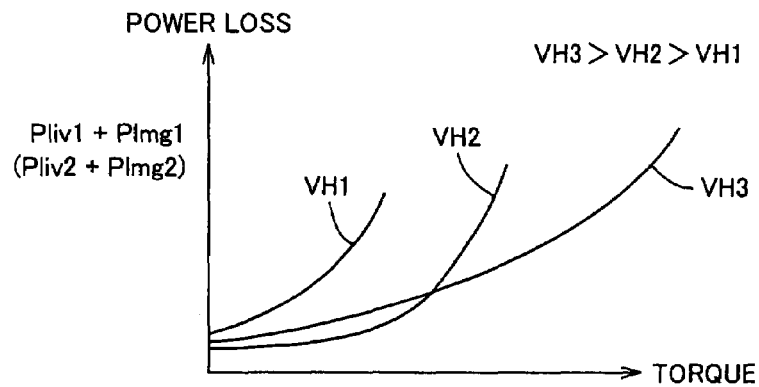
FIG. 11 is a schematic diagram illustrating an exemplary variation characteristic of the sum of inverter loss and MG loss.

By way of example, FIG. 11 shows relation between the system voltage and the torque, and the sum of power losses Pliv1+Plmg1 of inverter 20 and motor generator MG1 (and the sum of power losses Pliv2+Plmg2 of inverter 30 and motor generator MG2), with a certain constant number of rotations. FIG. 11 shows that a map for estimating inverter loss and MG loss can be set in advance, based on the number of rotations and the torque (torque command value) of motor generator MG and the system voltage, in consideration of the difference between each of the applied control methods described above. Here, the inverter loss can be estimated by setting in advance the method of control to be selected in correspondence with the state of operation (that is, number of rotations and torque command value) of motor generator MG.

Figure 12:
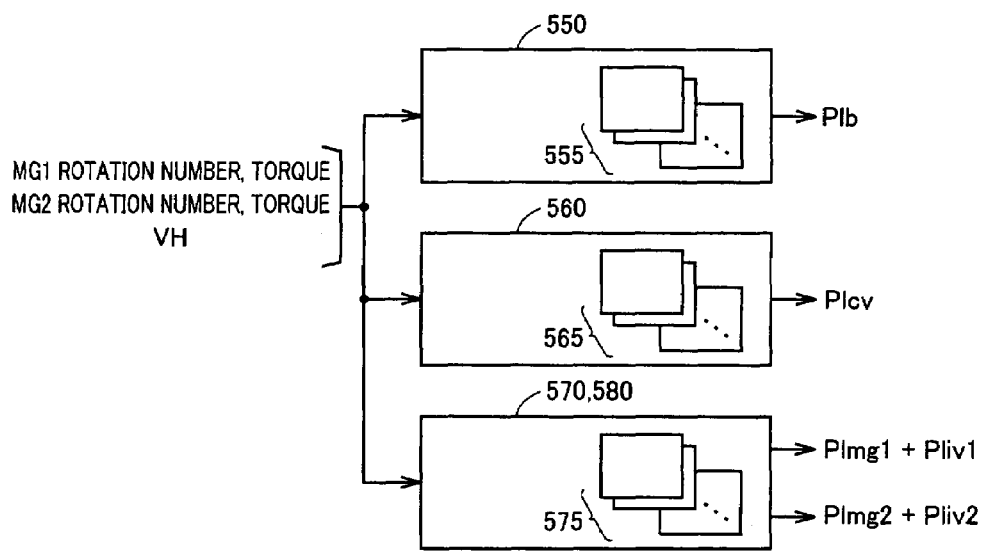
FIG. 12 is a block diagram representing an example of power loss estimation in each component of the electric motor drive control system in accordance with an embodiment of the present invention.

As a result, as shown in FIG. 12, it is possible to provide a battery loss estimating unit 550 estimating battery loss Plb, a converter loss estimating unit 560 for estimating converter loss Plcv, an inverter loss estimating unit 570 estimating inverter losses Pinv1 and Pinv2 and an MG loss estimating unit 580 estimating MG losses Plmg1 and Plmg2 at motor generators MG1 and MG2, mainly using as an argument at least one of the rotation number/torque (torque command value Tqcom(1)) of motor generator MG1, the rotation number/torque (torque command value Tqcom(2)) of motor generator MG2 and the system voltage VH.

For instance, a map 555 based on the characteristic shown in FIG. 8 may be formed in advance in battery loss estimating unit 550, and by making a reference to the map 555, based on the state of operations of motor generators MG1 and MG2 as well as the candidate voltage VH(i) of system voltage VH, battery loss Plb at that time can be estimated.

Similarly, a map 565 based on the characteristic shown in FIG. 9 may be formed in advance in converter loss estimating unit 560, and by making a reference to the map 565, based on the state of operations of motor generators MG1 and MG2 as well as the candidate voltage VH(i) of system voltage VH, converter loss Plcv at that time can be estimated.

As map 555 for estimating battery loss Plb and map 565 for estimating converter loss Plcv described above, maps that use the voltage difference |VH−Vb| or the system voltage VH (candidate voltage VH(i)) as the argument may be formed.

Further, by forming a map 575 reflecting the characteristic shown in FIG. 11, inverter loss estimating unit 570 and MG loss estimating unit 580 can be formed integrally, for estimating the sum of inverter loss and MG loss Plmg1+Pliv1 (or Plmg2+pliv2), using the state of operations of motor generators MG1 and MG2 as well as the candidate voltage VH(i) as arguments.

Alternatively, inverter loss estimating unit 570 may be formed to estimate inverter loss Pliv1 (Pliv2) further reflecting the control methods described above.

Figure 13:
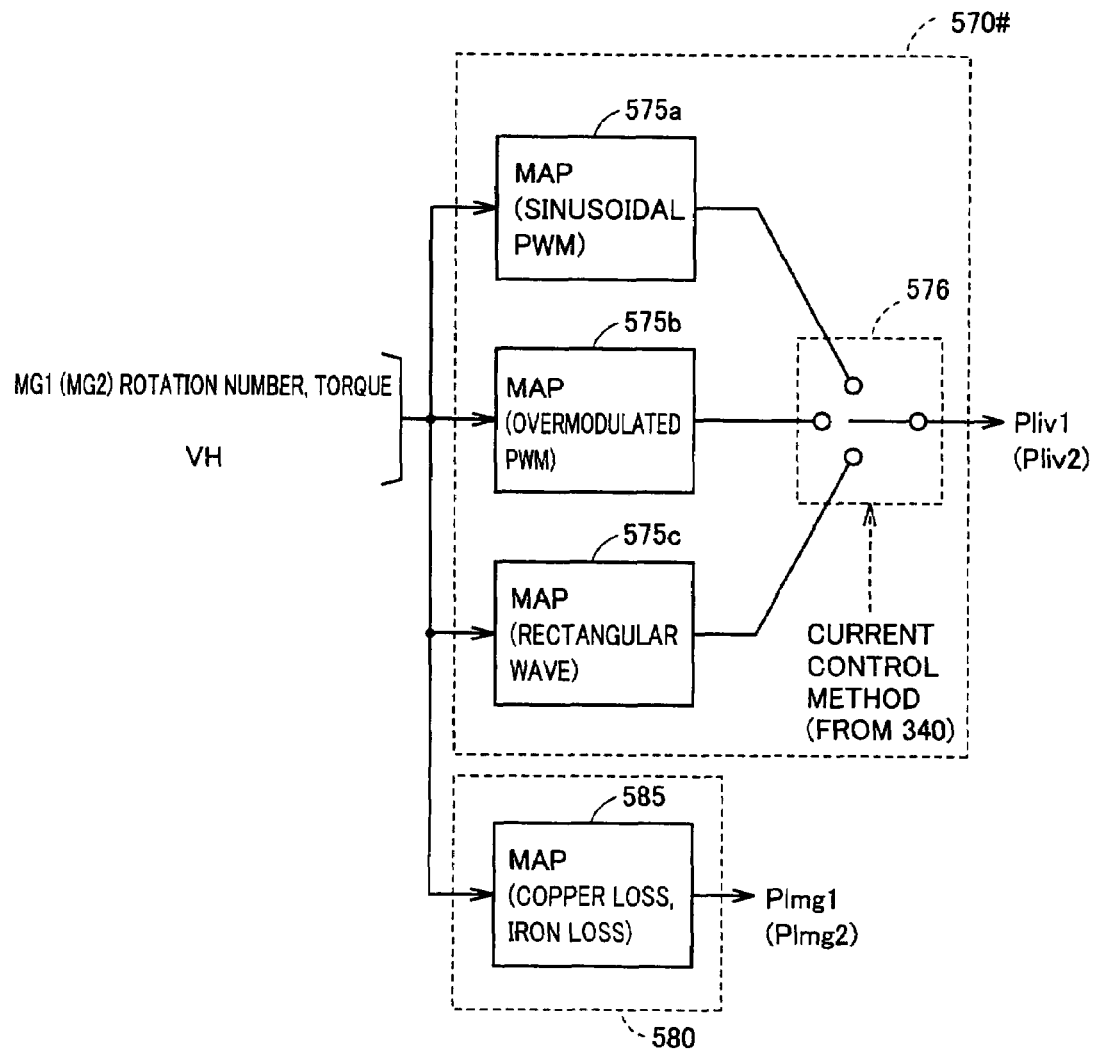
FIG. 13 is a block diagram representing another example of power loss estimation in each component of the electric motor drive control system in accordance with an embodiment of the present invention.

Referring to FIG. 13, an inverter loss estimating unit 570# is provided independent from MG loss estimating unit 580. As described above, MG loss estimating unit 580 is formed by incorporating a map 585 based on estimation of copper loss and iron loss, using the state of operation (rotation number/torque) of motor generator MG1 (MG2) as an argument. By making a reference to map 585, MG loss estimating unit 580 estimates MG losses Plmg1 and Plmg2, based on the state of operation (rotation number/torque) of motor generator MG1 (MG2).

Inverter loss estimating unit 570# includes maps 575a, 575b and 575c provided corresponding to respective control methods, as well as an output switching unit 576.

Map 575a is formed to allow estimation of inverter loss Pliv1 (Pliv2) mainly reflecting switching loss at the switching elements, using the state of operation (rotation number/torque) of the corresponding motor generator MG1 (MG2) and the system voltage (candidate voltage VH(i)) as the arguments, under sinusoidal PWM control.

Similarly, map 575b is formed to allow estimation of inverter loss Pliv1 (Pliv2) mainly reflecting switching loss at the switching elements, using the state of operation (rotation number/torque) of the corresponding motor generator MG1 (MG2) and the system voltage (candidate voltage VH(i)) as the arguments, under overmodulation PWM control.

Similarly, map 575c is formed to allow estimation of inverter loss Pliv1 (Pliv2) mainly reflecting switching loss at the switching elements, using the state of operation (rotation number/torque) of the corresponding motor generator MG1 (MG2) and the system voltage (candidate voltage VH(i)) as the arguments, under rectangular wave voltage control.

Output switching unit 576 selects one map from maps 575a, 575b and 575c, in accordance with the method of control selected at present, in accordance with the output of control method selecting unit 340. Accordingly, based on the reference of the map selected by output switching unit 576, inverter loss Pliv1 (Pliv2) can be estimated.

In the structure shown in FIG. 13, even when the point (rotation number/torque) of switching the control method during actual control operation becomes different from the designed point due to variations in characteristics of motor generators MG1 and MG2 (typically, variation of magnetism of permanent magnets mounted on the rotors), the inverter loss can be estimated more accurately.

As described above, in the electric motor drive control system in accordance with the embodiment of the present invention, in a voltage range where the minimum necessary voltage of motor generators MG1 and MG2 is ensured, the system voltage VH can be set to an optimal voltage that minimizes the total sum of power loss in the system as a whole, based on power loss estimation of each of the DC power source (battery), converter, inverters and motor generators MG. As a result, mileage of the hybrid vehicle incorporating the electric motor drive control system can be improved.

Particularly, as the method of control is reflected on the estimation of inverter loss, the loss in electric motor drive control system as a whole with respect to variation in system voltage VH can more accurately be estimated. As a result, setting of system voltage VH can further be optimized, and the overall efficiency of the electric motor drive control system can more reliably be improved.

In the present embodiment, step S150 of FIG. 5 or battery loss estimating unit 550 of FIG. 12 corresponds to the "first loss estimating unit" of the present invention, and step S152 of FIG. 5 or converter loss estimating unit 560 of FIG. 12 corresponds to the "second loss estimating unit" of the present invention. Further, step S154 of FIG. 5 or inverter loss estimating unit 570 of FIG. 12 corresponds to the "third loss estimating unit" of the present invention, and step S156 of FIG. 5 or MG loss estimating unit 580 of FIG. 12 corresponds to the "fourth loss estimating unit" of the present invention. Further, steps S130 and S160 to S180 of FIG. 5 or voltage command value generating unit 300 of FIG. 3 correspond to the "voltage command value generating unit" of the present invention.

In the present embodiment, calculations of battery loss, converter loss, inverter loss and MG loss are only the representative examples, and these losses may be estimated based on other methods or other variables. Even in that case, by establishing the system voltage VH that minimizes the power loss of the overall system by summing estimated losses of various components, it becomes possible to calculate the optimal voltage VHopt and to set the corresponding voltage command value VH#.

Further, a control structure may be adopted in which, among the battery loss, converter loss, inverter loss and MG loss, only the power loss or losses that significantly vary dependent on the variation of system voltage VH may be estimated and the total sum thereof may be calculated. In such a structure, the setting of system voltage VH can be set optimally while burden of calculation is alleviated.

In the present embodiment, the electric motor drive control system mounted on a hybrid vehicle has been described as a representative. Application of the present invention, however, is not limited thereto. Specifically, the motor driving system in accordance with the present invention may be applied to an electric motor drive control system mounted on a vehicle other than the hybrid vehicle as represented by an electric vehicle. Further, the present invention is applicable to any electric motor drive control system including a converter capable of variably controlling a DC voltage, without any limitation on the type or number of motor generators (or electric motors/generators) of which driving is controlled or on the load driven by the motor generator (electric motor).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electric motor drive control system, comprising:
a DC power source;
a converter configured to allow step up of an output voltage of said DC power source, for variably controlling the output voltage of said DC power source in accordance with a voltage command value and outputting to a DC power line;
an inverter performing power conversion between an AC power driving an electric motor and a DC power on said DC power line, by a plurality of switching elements, so that said electric motor operates in accordance with an operation command; and
a controller setting said voltage command value of said converter; wherein
said controller includes
a first loss estimating unit for estimating power loss at said DC power source based on a preset loss characteristic,
a second loss estimating unit for estimating power loss at said converter based on a preset loss characteristic,
a third loss estimating unit for estimating power loss at said inverter based on a preset loss characteristic, and
a voltage command value generating unit calculating a minimum necessary voltage in correspondence with an induction voltage of said electric motor, based on a state of operation of said electric motor, establishing a DC voltage on said DC power line that minimizes total power loss including a sum of power losses estimated by said first to third loss estimating units, within a candidate voltage range not smaller than said minimum necessary voltage and not larger than an output upper limit voltage of said converter, and setting said voltage command value in accordance with the established DC voltage.

2. The electric motor drive control system according to claim 1, wherein
said controller further includes
a fourth loss estimating unit for estimating power loss at said electric motor based on a preset loss characteristic; and
said voltage command value generating unit calculates said total power loss based on a sum of said power losses estimated by said first to fourth loss estimating units, establishes said DC voltage that minimizes said total power loss in said candidate voltage range and sets said voltage command value in accordance with the established DC voltage.

3. The electric motor drive control system according to claim 1, wherein switching control of said inverter is executed by selecting one control method from a plurality of control methods; and said third loss estimating unit estimates power loss at said inverter, in accordance with rotation speed and torque of said electric motor and with the selected control method, based on said loss characteristic set for each of said control methods.

4. The electric motor drive control system according to claim 3, wherein said plurality of control methods include sinusoidal pulse width modulation control in which switching control on said inverter is executed such that voltage of each phase applied to said electric motor becomes a voltage with pulse-width-modulated waveform in accordance with said voltage command value, overmodulation pulse width modulation control in which switching control on said inverter is executed such that voltage of each phase applied to said electric motor becomes a voltage with pulse-width-modulated waveform with higher modulation factor than in said sinusoidal pulse width modulation control, and rectangular wave voltage control in which switching control on said inverter is executed such that voltage of each phase applied to said electric motor becomes a voltage with rectangular wave in accordance with said voltage command value.

5. The electric motor drive control system according to claim 1, wherein said loss characteristic represents variation in said power loss with respect to at least one of rotation speed and torque of said electric motor and DC voltage on said DC power line.

6. A method of controlling an electric motor drive control system, wherein said electric motor drive control system includes a DC power source, a converter configured to allow step up of an output voltage of said DC power source, for variably controlling the output voltage of said DC power source in accordance with a voltage command value and outputting to a DC power line, and an inverter performing power conversion between an AC power driving an electric motor and a DC power on said DC power line, by a plurality of switching elements, so that said electric motor operates in accordance with an operation command;

said method of control comprising the steps of:

estimating power loss at said DC power source based on a preset loss characteristic;

estimating power loss at said converter based on a preset loss characteristic;

estimating power loss at said inverter based on a preset loss characteristic;

calculating a minimum necessary voltage in correspondence with an induction voltage of said electric motor, based on a state of operation of said electric motor;

establishing a DC voltage on said DC power line that minimizes total power loss including a sum of said estimated power losses, within a candidate voltage range not smaller than said minimum necessary voltage and not larger than an output upper limit voltage of said converter; and setting said voltage command value in accordance with the established DC voltage.

7. The method of controlling an electric motor drive control system according to claim 6, further comprising the step of estimating power loss at said electric motor based on a preset loss characteristic; wherein in said step of establishing, said total power loss is calculated based on a sum of estimated power loss at said DC power source, power loss at said converter, power loss at said inverter and power loss at said electric motor, and said DC voltage that minimizes said total power loss in said candidate voltage range is established.

8. The method of controlling an electric motor drive control system according to claim 6, wherein switching control of said inverter is executed by selecting one control method from a plurality of control methods; and in said step of estimating power loss at said inverter, power loss at said inverter is estimated in accordance with rotation speed and torque of said electric motor and with the selected control method, based on said loss characteristic set for each of said control methods.

9. The method of controlling an electric motor drive control system according to claim 8, wherein said plurality of control methods include sinusoidal pulse width modulation control in which switching control on said inverter is executed such that voltage of each phase applied to said electric motor becomes a voltage with pulse-width-modulated waveform in accordance with said voltage command value, overmodulation pulse width modulation control in which switching control on said inverter is executed such that voltage of each phase applied to said electric motor becomes a voltage with pulse-width-modulated waveform with higher modulation factor than in said sinusoidal pulse width modulation control, and rectangular wave voltage control in which switching control on said inverter is executed such that voltage of each phase applied to said electric motor becomes a voltage with rectangular wave in accordance with said voltage command value.

10. The method of controlling an electric motor drive control system according to claim 6, wherein said loss characteristic represents variation in said power loss with respect to at least one of rotation speed and torque of said electric motor and DC voltage on said DC power line.

* * * * *